No. 735,449. PATENTED AUG. 4, 1903.
O. BERGER.
PIPE.
APPLICATION FILED FEB. 24, 1903.
NO MODEL.
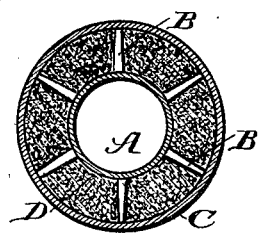
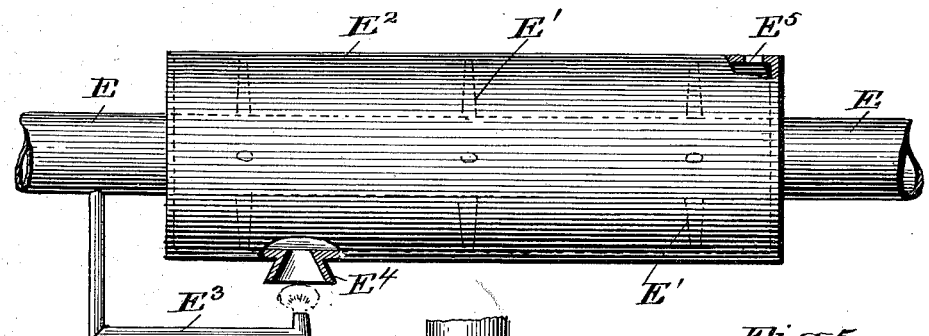
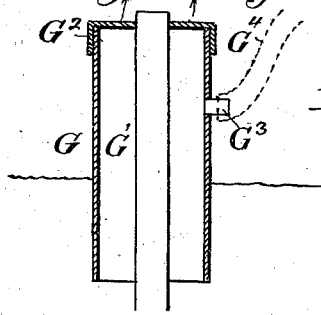
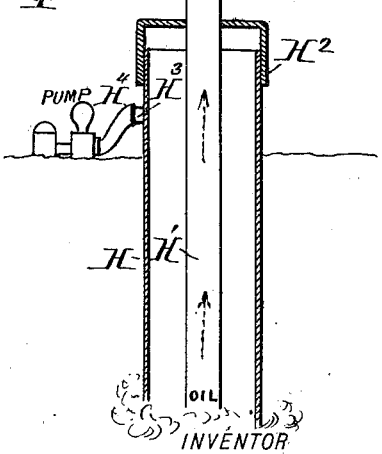
WITNESSES:
Jos. A. Ryan
Harrison B. Brown
INVENTOR
Otto Berger.
BY Munn & Co.
ATTORNEYS.

No. 735,449.

Patented August 4, 1903.

UNITED STATES PATENT OFFICE.

OTTO BERGER, OF GALVESTON, TEXAS.

PIPE.

SPECIFICATION forming part of Letters Patent No. 735,449, dated August 4, 1903.

Application filed February 24, 1903. Serial No. 144,761. (No model.)

*To all whom it may concern:*

Be it known that I, OTTO BERGER, a citizen of the United States, residing at Galveston, in the county of Galveston and State of Texas, have invented certain new and useful Improvements in Pipes, of which the following is a specification.

My invention relates, more definitely stated, to novel means for insulating against heat or cold water-mains, oil-well tubing, and, in fact, gas and all fluid conveying pipes.

The invention consists, broadly stated, of arranging the fluid or gas conducting pipe within a larger pipe and special means whereby the inner pipe is concentrically supported, providing uniform surrounding space between it and the outer pipe, adapted to receive insulating-packing, or for effective flow of hot or cold fluid around the inner pipe, according to whether its contents are to be cooled or heated.

The invention consists, further, of novel construction and arrangement of parts, which I will now proceed to describe in detail, with reference to the accompanying drawings, forming a part of this specification.

In the drawings, Figure 1 is a transverse sectional view through two pipes arranged and supported adapted to receive packing according to my invention. Fig. 2 is a view illustrating a modified adaptation of my invention employing hot air for protecting gas-pipes in exposed places against freezing, and Fig. 3 is a view illustrating my invention in connection with oil-well tubing. Figs. 4 and 5 illustrate modified forms and uses to which my invention is adapted.

In carrying out my invention I provide the inner or conducting pipe A with a series of radial barbs B. The inner pipe A is arranged within a larger pipe C and concentrically supported therein by the barbs B, as clearly shown in Fig. 1 of my drawings.

It is apparent that pipes held spaced apart, one within the other, by positive supporting means, substantially as the barbs B, are adapted to have the space between them packed with any insulating material D, uniformly inclosing the inner or conducting pipe A.

I do not claim the broad idea of arranging one pipe within a larger pipe or employing packing between them, since I am aware that such arrangement of pipes and packing is not original with me. My invention is directed to provide means for concentrically supporting the inner pipe whereby its whole surface may be uniformly and evenly packed, as described above, or adapted to receiving heating or cooling agents, as illustrated by Figs. 2 and 3 of my drawings.

In Fig. 2 I show a gas-pipe E, concentrically supported by barbs $E'$ thereon within an inclosing pipe $E^2$. This adaptation of my invention is for protecting the pipe in exposed places. In carrying out the idea a pilot-light $E^3$, receiving gas from the main supply, is arranged under one end of the inclosing pipe $E^2$, adapted to supply hot air through the funnel-opening $E^4$ on the under side of the inclosing pipe, having a vent $E^5$ on top, as shown in Fig. 2.

For protecting oil-well tubing concentrically supported within an inclosing casing F (see Fig. 3) steam may be employed and passed through a pipe $F'$ into the space between the two pipes.

From the above description it will be understood that the leading feature of my invention resides in concentrically supporting gas, water, and other pipe one within the other, providing a uniform surrounding space adapted to receive steam, oils, spirits, or other liquids that do not easily freeze. Obviously cold liquids may be passed through the space between the two pipes for protecting material passing through the inner pipe against excessive heat.

My invention in its broad sense comprehends many applications or uses not hereinbefore mentioned. In Figs. 4 and 5 I show two obvious modifications involving the same general idea hereinbefore described—*i. e.,* utilizing an outer casing spaced concentrically from an inner tube. The modification shown in Fig. 4 illustrates simple means for sinking a tube by suction. In this use of my invention I employ an outer casing G in connection with a tube $G'$, which is to be sunk into the ground. The casing G is provided with a cap $G^2$, through which the tube $G'$ is adapted to pass, and a hollow nipple $G^3$, with which a suction-tube $G^4$ (shown in dotted lines) is connected. According to this use of my invention suction produced through the G⁴ by suitable means in the space between the casing G and tube G' will loosen and draw up and out through the tube G⁴ dirt, &c., from the lower end of the casing G. With the dirt, &c., loosened and removed, as just stated, obviously sinking of the tube G' and the casing G is facilitated. It will be understood that additional sections of the casing F and tube G' are connected, as common in sinking tubular wells. In the adaptation of my invention as shown by Fig. 5 H indicates a casing around an oil-well tube H'. This casing is provided with a cap H² and a hollow nipple H³, with which latter a suitable force-pump H⁴ is connected. The casing H should extend down to or below the oil-bearing rock or level, and thereby provide a chamber outside of the tube H' in which oil will collect. Now obviously when steam, hot air, or water is forced down the space between the casing H and tube H' oil in said space will thereby be forced into the tube H' through its lower end with upward flow, as indicated by arrows.

Having thus described my invention, what I claim as new, and desire to secure by Letters Patent, is—

1. In combination, two pipes concentrically arranged and spaced one within the other, the inner pipe having radial barbs of length adapted to preserve uniform spacing between it and the outer pipe, the latter pipe having closed ends and openings in opposite sides thereof, near its closed ends, substantially as described.

2. In combination, inner and outer spaced pipes concentrically arranged one within the other, radial barbs on the inner pipe, of length adapted, to preserve uniform spacing between it and the outer pipe, the outer pipe being closed at its ends and having openings on opposite sides thereof near its ends, a flaring mouth to the lowermost of the said openings in the outer pipe, and a burner located outside the outer pipe adjacent to the said flaring mouth, substantially as described.

OTTO BERGER.

Witnesses:
J. W. WOOD,
C. F. SETTLE.